(12) United States Patent
Takemoto et al.

(10) Patent No.: US 11,981,581 B2
(45) Date of Patent: *May 14, 2024

(54) STANNOUS OXIDE POWDER

(71) Applicant: JX Metals Corporation, Tokyo (JP)

(72) Inventors: Koichi Takemoto, Ibaraki (JP); Toru Imori, Tokyo (JP)

(73) Assignee: JX Metals Corporation, Tokyo (JP)

( * ) Notice: Subject to any disclaimer, the term of this patent is extended or adjusted under 35 U.S.C. 154(b) by 837 days.

This patent is subject to a terminal disclaimer.

(21) Appl. No.: 16/978,439

(22) PCT Filed: Dec. 6, 2018

(86) PCT No.: PCT/JP2018/045006
§ 371 (c)(1),
(2) Date: Sep. 4, 2020

(87) PCT Pub. No.: WO2019/171692
PCT Pub. Date: Sep. 12, 2019

(65) Prior Publication Data
US 2021/0047198 A1 Feb. 18, 2021

(30) Foreign Application Priority Data
Mar. 5, 2018 (JP) .................. 2018-039002

(51) Int. Cl.
*C01G 19/02* (2006.01)
*C25D 3/32* (2006.01)

(52) U.S. Cl.
CPC ............. *C01G 19/02* (2013.01); *C25D 3/32* (2013.01); *C01P 2004/61* (2013.01);
(Continued)

(58) Field of Classification Search
CPC ....... C01G 19/02; C25D 3/32; C01P 2004/61; C01P 2004/51; C01P 2006/11; C01P 2006/12; C01P 2006/82; C01P 2006/80
See application file for complete search history.

(56) References Cited

U.S. PATENT DOCUMENTS 9,067,800 B2 * 6/2015 Katase .................. C01G 19/02
2008/0032132 A1 2/2008 Woodfield et al.
(Continued)

FOREIGN PATENT DOCUMENTS

CN 101367543 A 2/2009
CN 103043711 A 4/2013
(Continued)

OTHER PUBLICATIONS

Hirano et al. JP2016153361A English Translation (Year: 2016).*
(Continued)

*Primary Examiner* — Samir Shah
*Assistant Examiner* — Jordan W Taylor
(74) *Attorney, Agent, or Firm* — Faegre Drinker Biddle & Reath LLP

(57) ABSTRACT

The purpose of the present invention is to provide a stannous oxide, which has excellent solubility and resistance to oxidation, from a stannous oxide powder comprising a stannous oxide and inevitable impurities, the stannous oxide powder having a stannous oxide content of 99.99 mass % or more in dry mass, a specific surface area of less than 0.5 m²/g, a D50 particle size of 20 to 60 μm, and a half width of the particle size distribution of 5 to 30 μm.

7 Claims, 6 Drawing Sheets

(52) U.S. Cl.
CPC ....... *C01P 2006/11* (2013.01); *C01P 2006/12* (2013.01); *C01P 2006/82* (2013.01)

(56) References Cited

U.S. PATENT DOCUMENTS

| | | | |
|---|---|---|---|
| 2012/0195822 | A1 | 8/2012 | Werner et al. |
| 2013/0084414 | A1 | 4/2013 | Grandbois |
| 2013/0289133 | A1 | 10/2013 | Doshita et al. |
| 2014/0079618 | A1 | 3/2014 | Katase et al. |
| 2014/0127109 | A1 | 5/2014 | Katase et al. |
| 2017/0009078 | A1* | 1/2017 | Katase ............... C23C 18/1617 |
| 2018/0327274 | A1 | 11/2018 | Hirano et al. |
| 2020/0231461 | A1 | 7/2020 | Takemoto et al. |
| 2021/0047198 | A1 | 2/2021 | Takemoto et al. |
| 2021/0331934 | A1 | 10/2021 | Takemoto |

FOREIGN PATENT DOCUMENTS

| | | | | |
|---|---|---|---|---|
| CN | 105813980 | A | | 7/2016 |
| CN | 106587139 | A | | 4/2017 |
| CN | 105813980 | B | | 8/2017 |
| CN | 107001065 | A | | 8/2017 |
| CN | 110997570 | A | | 4/2020 |
| CN | 111836781 | A | | 10/2020 |
| EP | 3070055 | A1 | | 9/2016 |
| EP | 3260420 | A1 | | 12/2017 |
| EP | 3712114 | A1 | | 9/2020 |
| EP | 3763677 | A1 | | 1/2021 |
| JP | S60221319 | A | | 11/1985 |
| JP | S6252130 | A | | 3/1987 |
| JP | H11310415 | A | | 11/1999 |
| JP | 2007302496 | A | | 11/2007 |
| JP | 2009132570 | A | | 6/2009 |
| JP | 2009132571 | A | | 6/2009 |
| JP | 2012051762 | A | | 3/2012 |
| JP | 4975367 | B2 | | 7/2012 |
| JP | 2012236724 | A | | 12/2012 |
| JP | 201379186 | A | | 5/2013 |
| JP | WO2012096172 | A1 | | 6/2014 |
| JP | 2016153361 | A | | 8/2016 |
| JP | 2016153361 | A | * 8/2016 | ............ C01G 19/02 |
| JP | 2016172885 | A | | 9/2016 |
| JP | 6095929 | B2 | | 3/2017 |
| TW | 1511928 | B | | 4/2012 |
| TW | 201704154 | A | | 2/2017 |
| WO | 2012096172 | A1 | | 7/2012 |
| WO | 2015133426 | A1 | | 9/2015 |
| WO | 2019171692 | A1 | | 9/2019 |

OTHER PUBLICATIONS

JP Office Action with English Translation for corresponding JP Patent Application No. 2020-504792 dated Oct. 5, 2022, 4 pages.
Extended European Search Report for related EP 19768694.2 corresponding to PCT/JP2019/015848, dated Mar. 18, 2022, 7 pages.
Extended European Search Report for the corresponding EP Application No. 18909201.8 dated May 31, 2021, 6 pages.
Chinese Office Action for corresponding Chinese Patent Application No. 201880090566.4, dated Dec. 2, 2022, 11 pages (including translation).
Chinese Office Action for corresponding Chinese Patent Application No. 201880049513.8, dated Dec. 13, 2022, 11 pages (including translation).
U.S. Office Action issued in related U.S. Appl. No. 16/494,021, dated Jan. 4, 2023, 30 pages.
Chinese Office Action for corresponding Chinese patent application No. 201980001813.3 dated Jul. 15, 2022, with translation, 15 pages.
US Office Action issued in corresponding U.S. Appl. No. 16/652,609 dated Mar. 16, 2023, 16 pages.
Chinese Office Action for the corresponding Chinese Patent Application No. 201980001813.3 dated Mar. 31, 2023 with Translation, 11 pages.
Chinese Office Action for corresponding Chinese Patent Application No. 201880090566.4 with translation, dated Apr. 1, 2023, 8 pages.
Chinese Office Action related to the corresponding Chinese Patent Application No. 201880049513.8 dated Jun. 21, 2022, with translation, 11 pages.
Chinese Office Action for corresponding Chinese Patent Application No. 201980001813.3 dated Dec. 6, 2021, 15 pages.
Extended European Search Report for corresponding EP 18877744.5 dated Dec. 11, 2020, 7 pgs.
Korean Office Action with Translation for KR 10-2020-7002015 related to PCT/JP2018/034052 dated May 11, 2021, 8 pages.
Chinese Office Action for corresponding Chinese Patent Application No. 201880049513.8 dated Nov. 22, 2021, 16 pages.
JP International Search Report for PCT/JP2018/045006 dated Aug. 1, 2019, 3 pages.
Chinese Office Action for related Chinese Patent Application No. 201880090566.4, dated Apr. 18, 2022, 14 pages (with translation).
Chinese Office Action for corresponding Chinese Patent Application No. 201880049513.8 dated May 26, 2023 with Translation, 10 pages.
Final Office Action for corresponding U.S. Appl. No. 16/652,609 dated Sep. 29, 2022, 35 pages.
US Office Action issued in corresponding U.S. Appl. No. 16/652,609, dated Nov. 8, 2023, 16 pages.
Chinese Office Action for the related Chinese Patent Application No. 201980001813.3 dated Aug. 11, 2023 with translation, 7 pages.

* cited by examiner

STANNOUS OXIDE POWDER

FIELD OF THE INVENTION

The present invention relates to stannous oxide powder.

BACKGROUND OF THE INVENTION

When performing tin plating, an insoluble electrode (platinum, noble metal oxide, or the like) may be used in place of metallic tin as a positive electrode. In this case, stannous oxide is often added as a supplement for tin ions that are consumed from an electrolyte. Stannous oxide (SnO) has a higher dissolution rate than that of stannic oxide ($SnO_2$), which can allow easy production of a supplying solution.

Stannous oxide for supplying tin ions is required to have good solubility in addition to less impurities. In order to improve the solubility, it is conventionally considered that an increased contact area with a solution is desirable. For example, Patent Literature 1 (Japanese Patent Application Publication No. 2016-153361 A) discloses a technique for improving the solubility of stannous oxide by increasing specific surface areas of particles of stannous oxide powder to have a shape with plate-like protrusions.

On the other hand, such an increased specific surface area in the particles of the stannous oxide powder causes a disadvantage that the particles are easily oxidized. The oxidization of stannous oxide (SnO) produces stannic oxide ($SnO_2$) to deteriorate the solubility, thereby deteriorating product quality as stannous oxide for supplying the tin ions.

Therefore, an antioxidant is often used to prevent the oxidation of stannous oxide. For example, Patent Literature 2 (Japanese Patent Application Publication No. 2016-172885 A) discloses a technique for maintaining the solubility while preventing the oxidation, by molding stannous oxide into a tablet mixed with an antioxidant.

CITATION LIST

Patent Literatures

[Patent Literature 1] Japanese Patent Application Publication No. 2016-153361 A
[Patent Literature 2] Japanese Patent Application Publication No. 2016-172885 A

SUMMARY OF THE INVENTION

Technical Problem

The addition of the antioxidant is effective in terms of prevention of oxidation. On the other hand, in view of the recently increasing demand for high-purity stannous oxide for supplying tin ions, it is preferable that the antioxidant is not added, because the antioxidant is an impurity even if it is for preventing the oxidation.

Thus, there would be a need for stannous oxide for supplying tin ions, which has improved solubility while at the same time having improved oxidation resistance even if the antioxidant is not added.

Accordingly, an object of the present invention is to provide stannous oxide that can be suitably used for supplying tin ions, and has improved solubility while at the same time having improved oxidation resistance.

Solution to Problem

As a result of intensive studies to solve the above problems, the present inventors have found that stannous oxide powder as described below has improved solubility while at the same time having improved oxidation resistance, and have arrived at the present invention.

Therefore, the present invention includes the following aspect (1):

(1)

A stannous oxide powder comprising stannous oxide and inevitable impurities, the stannous oxide powder having:
- a stannous oxide content of 99.99% by mass or more in dry mass;
- a specific surface area of less than 0.5 $m^2/g$;
- a D50 particle size of from 20 to 60 μm; and
- a half width of a particle size distribution of from 5 to 30 μm.

Advantageous Effects of Invention

The stannous oxide powder according to the present invention has improved solubility and also has improved oxidation resistance, and it can be suitably used as stannous oxide powder for supplying tin ions.

DETAILED DESCRIPTION OF THE INVENTION

Figure 1:
FIG. 1 shows an appearance of a solution of stannous oxide according to Example 1 in a dissolution test.

The present invention will be described below in detail with reference to embodiments. The present invention is not limited to the specific embodiments described below.

Stannous Oxide Powder

In a preferable embodiment, the stannous oxide powder according to the present invention relates to:
a stannous oxide powder comprising stannous oxide and inevitable impurities, the
stannous oxide powder having:
- a stannous oxide content of 99.99% by mass or more in dry mass;
- a specific surface area of less than 0.5 $m^2/g$;
- a D50 particle size of from 20 to 60 μm; and
- a half width of a particle size distribution of from 5 to 30 μm.

In a preferred embodiment, the stannous oxide powder can be prepared by carrying out a step of subjecting stannous sulfate to neutralization reaction with ammonium carbonate or ammonium bicarbonate in an aqueous solution to precipitate stannous oxide, under the following conditions.

Neutralization Reaction

In a preferred embodiment, the neutralization reaction is carried out by adding an aqueous stannous sulfate solution to an aqueous ammonium carbonate or ammonium bicarbonate solution. The addition of the aqueous stannous sulfate solution can be carried out by a known means, for example, a means such as dropping, injecting, and spraying. In a preferred embodiment, the aqueous solution is optionally stirred during the neutralization reaction. The stirring can be carried out by known means.

PH

In a preferred embodiment, the neutralization reaction is carried out in an aqueous solution, for example in a range of from pH 7.0 to pH 8.0. The pH can be adjusted, for example, by adding ammonium carbonate, ammonium bicarbonate, or aqueous ammonia. Alternatively, the pH may be adjusted by blowing carbon dioxide into the reaction solution. The pH value is preferably maintained in the above range through two stage temperature adjustment as described later.

Reaction Temperature and Time

In a preferred embodiment, the temperature of the solution subjected to the neutralization reaction is adjusted in two stages. That is, the reaction temperature is adjusted in two stages: a temperature at which the neutralization reaction is allowed to proceed by dropping the stannous sulfate solution and the aqueous ammonium carbonate or ammonium bicarbonate solution (a first stage reaction temperature); and a temperature at which the neutralization reaction is maintained after the end of the dropping (a second stage reaction temperature). The temperature during dropping, i.e., the first stage temperature can be from 60 to 70° C., for example. The dropping time, i.e., a retention time of the first stage temperature can be from 1 to 5 hours, for example. The retention temperature after dropping, i.e., the second stage temperature, can be from 70 to 80° C., for example. The retention time after dropping, i.e., the retention time of the second stage temperature can be from 0.5 to 2 hours, for example.

Ammonium Bicarbonate Concentration

When the aqueous ammonium bicarbonate solution is used in the neutralization reaction, a concentration of ammonium bicarbonate can be, for example, in a range of from 80 to 200 g/L. When the aqueous ammonium carbonate solution is used in the neutralization reaction, it can be suitably used in the same concentration range as that of ammonium bicarbonate.

Tin Concentration

When the aqueous stannous sulfate solution is used in the neutralization reaction, a concentration of tin in the aqueous stannous sulfate solution can be, for example, in a range of from 20 to 100 g/L.

Deposition of Stannous Oxide

By the neutralization reaction, stannous oxide is deposited and precipitated. The resulting precipitate can be subjected to solid-liquid separation to obtain stannous oxide powder. The solid-liquid separation can be carried out by a known means such as suction, squeeze filtration, decantation, and centrifugation. The stannous oxide powder may be washed as desired, for example, in combination with a separating means such as centrifugation.

Purity of Stannous Oxide Powder

Stannous oxide (SnO) powder obtained by the present invention is composed of stannous oxide and inevitable impurities, and can have, for example, a stannous oxide content of 99.99% by mass or more, more preferably 99.995% by mass or more, for example, in a range of from 99.99 to 99.995% by mass, preferably from 99.99 to 99.999% by mass. The content of impurities as described later can be determined by means of an ICP mass spectrometer (commonly known as ICP-MS), an ICP optical emission spectrometer (commonly known as ICP-OES), a flame atomic absorption spectrometer (commonly known as AAS), a chlorine/sulfur analyzer/total organic halogen analyzer (commonly known as TOX) and a carbon/sulfur analyzer (commonly known as LECO).

Cl Content

In a preferred embodiment, a Cl content (chlorine content) of the stannous oxide powder can be, for example, less than 5 ppm, and preferably 1 ppm or less, and more preferably less than 1 ppm, as a content excluding moisture contained in a water content as separately described. The stannous oxide according to the present invention can allow a significantly decreased Cl content because the use of a hydrochloric acid-based aqueous solution is avoided in the production. The Cl content can be measured by TOX (TOX-2100H from Mitsubishi Chemical Analytech Co., Ltd.).

S Content

In a preferred embodiment, a S content (sulfur content) of the stannous oxide powder can be, for example, less than 20 ppm, and preferably 10 ppm or less, and more preferably less than 10 ppm, as a content excluding moisture contained in a water content as separately described. The stannous oxide according to the present invention can allow a significantly decreased S content despite the use of the aqueous sulfate solution in the production. The S content can be measured by LECO (CSLS600 available LECO JAPAN CORPORATION).

Na Content and K Content

In a preferred embodiment, a Na content (sodium content) of the stannous oxide powder can be, for example, 5 ppm or less, and preferably 1 ppm or less, and more preferably less than 1 ppm (less than the detection limit), as a content excluding moisture contained in a water content as separately described. In a preferred embodiment, a K content (potassium content) of the stannous oxide can be, for example, 5 ppm or less, and preferably 1 ppm or less, and more preferably less than 1 ppm (less than the detection limit). The stannous oxide according to the present invention can allow significantly decreased Na and K contents because the use of sodium-containing materials and potassium-containing materials is avoided in the production. The Na and K contents can be measured by AAS (AA240FS available from Agilent Technologies).

Other Impurity Content

In a preferred embodiment, the impurities in the stannous oxide powder can have, as contents excluding moisture contained in water contents as separately described, the following contents as those measured by ICP-MS (SPQ 9700 from Hitachi High-Tech Science Co., Ltd.) for Ag, As, Bi, Cd, Cr, Cu, In, Mg, Mn, Pb, Sb, Th, Tl, U and Zn, and the following contents measured by ICP-OES (SPS 3500 DD from Hitachi High-Tech Science Co., Ltd.) for Ca, Co, Fe, Ni, and P:

The Ag content is 1 ppm or less, preferably less than 1 ppm (less than the detection limit); the As content is 1 ppm or less, preferably less than 1 ppm (less than the detection limit); the Bi content is less than 1 ppm, preferably less than 1 ppm (less than the detection limit); the Ca content is 1 ppm or less, preferably less than 1 ppm (less than the detection limit); the Cd content is 1 ppm or less, preferably less than 1 ppm (less than the detection limit); the Co content is 1 ppm or less, preferably less than 1 ppm (less than the detection limit); the Cr content is 1 ppm or less, preferably less than 1 ppm (less than the detection limit); the Cu content is 1 ppm or less, preferably less than 1 ppm (less than the detection limit); the Fe content is 1 ppm or less, preferably less than 1 ppm (less than the detection limit); the In content is 1 ppm or less, preferably less than 1 ppm (less than the detection limit); the Mg content is 1 ppm or less, preferably less than 1 ppm (less than detection limit); the Mn content is 1 ppm or less, preferably less than 1 ppm (less than detection limit); the Ni content is 1 ppm or less, preferably less than 1 ppm (less than detection limit); the Pb content is 1 ppm or less, preferably less than 1 ppm (less than detection limit); the Th content is 1 ppm or less, preferably less than 1 ppm (less than the detection limit); the Tl content is 1 ppm or less, preferably less than 1 ppm (less than the detection limit); the U content is 1 ppm or less, preferably less than 1 ppm (less than the detection limit); the Zn content is 1 ppm or less, preferably less than 1 ppm (less than the detection limit); the P content is 20 ppm or less, preferably 10 ppm or less, more preferably less than 10 ppm (less than the detection limit); and the Sb content is 5 ppm or less, preferably 2 ppm or less, more preferably 1.6 ppm or less, or 0.1 ppm or more, preferably 0.5 ppm or more, more preferably 1.0 ppm or more.

Shape of Stannous Oxide Powder

In a preferred embodiment, a secondary particle of the stannous oxide powder (stannous oxide powder) has for example, a spherical shape and a combined shape thereof.

Water Content

In a preferred embodiment, the stannous oxide powder can have a moisture content (a water content) in a range of, for example, from 1 to 10% by weight, preferably from 1 to 5% by weight, more preferably from 1 to 4% by weight. The water content according to the present invention can be measured by weight loss in dry.

Specific Surface Area

In a preferred embodiment, the stannous oxide powder can have a specific surface area of, for example, 1.0 m²/g or less, preferably 0.5 m²/g or less, for example from 0.1 to 1.0 m²/g, preferably from 0.1 to 0.9 m²/g, more preferably from 0.2 to 0.5 m²/g. The specific surface area according to the present invention can be measured by Monosorb MS-21 from QUANTA CHROME.

TAP Density

In a preferred embodiment, the stannous oxide powder can have a TAP density, for example in a range of from 1.0 to 4.0 g/cm³, preferably from 2.0 to 3.0 g/cm³. The TAP density according to the present invention can be measured by TAPDENSER KYT-4000K from SEISHIN ENTERPRISES Co., Ltd.

50% Particle Size (D50)

In a preferred embodiment, the stannous oxide powder can have a 50% particle size (D50), for example in a range of from 20 to 60 μm, preferably from 30 to 60 μm, from 30 to 50 μm, more preferably from 40 to 60 μm. The 50% particle size (D50) according to the present invention can be measured by MT 3300 EX2 from MicrotracBell Corp.

Half Width of Particle Size Distribution

In a preferred embodiment, a half width of the particle size distribution of the stannous oxide powder can be, for example, 50 μm or less, preferably 40 μm or less, more preferably 30 μm or less, further preferably 25 μm or less, for example, 1 μm or more, or 5 μm or more, for example, in a range of from 5 to 40 μm, preferably from 5 to 30 μm, more preferably from 5 to 25 μm, or preferably from 10 to 25 μm. The half width as used herein refers to a value expressed by a unit of length, which represents a difference value between a higher particle size side and a lower particle size side in the frequency of half of the maximum occurrence frequency in a graph of the particle size distribution, and which represents a degree of the expanse of a mountain shape. It means that as this value is lower, a variation in the particle size is less, and the sizes of the individual particles are more uniform.

Solubility

The stannous oxide powder according to the present invention has improved solubility and can be suitably used for supplying a plating solution. The solubility as used herein refers to solubility in a methanesulfonic acid solution. The solubility can be obtained as solubility under conditions of Examples as described later. That is, the solubility can be quantified by adding and dissolving 100 g/L of stannous oxide to and in a solution having a methanesulfonic acid concentration of 100 g/L and measuring a time (dissolution time) until the black color of stannous oxide disappears to become colorless and transparent or pale yellow color. In a preferred embodiment, the improved solubility can refer to a case where a turbidity after dissolution is 20 degrees and the dissolution time is 30 seconds or less, and a particularly improved solubility can refer to a case where the dissolution time is preferably 20 seconds or less, more preferably 10 seconds or less.

When using a turbidity after a sufficient time as an index of solubility, the index can be a turbidity after dissolving tin oxide in methanesulfonic acid and allowing it to stand for 5 minutes. The turbidity is "20 degrees" in pure water (colorless and transparent), and the maximum value is "500 degrees". As shown in Examples as described later, in a preferred embodiment, the turbidity of the solution of the stannous oxide powder according to the present invention can be "20 degrees". The turbidity can be measured with a turbidity meter, and examples of the turbidity meter include a digital turbidity meter 500G (model TB-500G) from Kyoritsu Chemical-Check Lab., Corp.

Oxidation Resistance

The stannous oxide powder according to the present invention has improved oxidation resistance and can maintain improved solubility even after storage for a long period of time, and it can be suitably used for supplying a plating solution. The oxidation resistance as used herein means that it is difficult to generate muddiness when preparing a plating solution. In a preferred embodiment, the stannous oxide powder according to the present invention has improved oxidation resistance. As used herein, the term "improved oxidation resistance" specifically means that after being stored at an ordinarily temperature and under an ordinarily pressure for 24 hours, a turbidity is 20 degrees or less for a dissolving time of 30 seconds or less in the above dissolution test.

Vacuum Package of Stannous Oxide Powder

In a preferred embodiment, the obtained stannous oxide powder can be rapidly vacuum-packed in an aluminum laminate bag to form a stannous oxide powder vacuum package. As the aluminum laminate bag, a known aluminum laminate packaging material can be used. As a means for the vacuum method, any known means can be used as long as it does not impair the characteristics of the stannous oxide powder according to the present invention.

Preferred Embodiment

In a preferred embodiment, the present invention may include the following aspects:

(1)
A stannous oxide powder comprising stannous oxide and inevitable impurities, the stannous oxide powder having:
a stannous oxide content of 99.99% by mass or more in dry mass;
a specific surface area of less than 0.5 m²/g;
a D50 particle size of from 20 to 60 μm; and
a half width of a particle size distribution of from 5 to 30 μm.

(2)
The stannous oxide powder according to (1), wherein a water content in stannous oxide is from 1 to 5 wt %.

(3)
The stannous oxide powder according to (1) or (2), wherein the stannous oxide powder has a chlorine content of 1 ppm or less and a sulfur content of 10 ppm or less.

(4)
The stannous oxide powder according to any one of (1) to (3), wherein the stannous oxide powder has a sodium content of 5 ppm or less and a potassium content of 5 ppm or less.

(5)
The stannous oxide powder according to any one of (1) to (4), wherein the stannous oxide powder has an antimony content of 5 ppm or less.

(6)
The stannous oxide powder according to any one of (1) to (5), wherein the stannous oxide powder has a TAP density of from 1.0 to 4.0 g/cm³.

(7)
The stannous oxide power according to any one of (1) to (6), wherein when 100 g/L of stannous oxide powder is added to a solution having a methanesulfonic acid concentration of 100 g/L, the stannous oxide is dissolved in the solution for a time less than 30 seconds and has a turbidity after dissolution of 20 degrees.

EXAMPLES

Hereinafter, the present invention will be described in more detail with reference to Examples. The present invention is not limited to the following Examples.

Example 1

[Production of Stannous Oxide]
Twenty (20) L of pure water was placed in a 50 L glass round bottom vessel as a reaction vessel, and 3.5 kg of ammonium bicarbonate was added to obtain a reaction mother solution (175 g/L of ammonium bicarbonate).

This solution was maintained while heating it at 65° C. to 70° C.

Twenty (20) L of a tin sulfate solution (a Sn concentration of 100 g/L) previously prepared by electrolysis of metallic tin was dropped in the ammonium bicarbonate solution.

The solution temperature during the dropping reaction was maintained at 65° C. to 70° C. in an oil bath (first stage heat-maintaining temperature). The dropping was carried out using an electromagnetic metering pump over about 2 hours. During the reaction, stirring was carried out using a stirrer. During the reaction, the acidic tin sulfate solution was introduced, so that the pH was decreased. Therefore, ammonium bicarbonate crystals were optionally added such that the pH could be maintained at 7.0 to 7.5.

At the end of the dropping, the temperature was raised to 75 to 80° C. and maintained for about 1 hour (second stage heat-maintaining temperature). Suction filtration was then carried out to perform solid-liquid separation. Further, 30 L of pure water was poured from above to wash the solid. After washing, the solid was not dried, and was double-vacuum-packed in an aluminum laminate bag as it was.

Particulate stannous oxide was thus obtained. The reaction formula for the neutralization reaction is shown below:

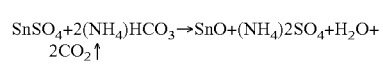

$$SnSO_4 + 2(NH_4)HCO_3 \rightarrow SnO + (NH_4)_2SO_4 + H_2O + 2CO_2\uparrow$$

[Evaluation of Stannous Oxide]
The resulting particulate stannous oxide was evaluated as follows.

The impurity content was analyzed using ICP-MS, ICP-OES, AAS, TOX, LECO and the like.

The water content was analyzed using a dryer and an electronic balance.

The specific surface area was measured using Monosorb MS-21 from QUANTA CHROME.

The TAP density was measured using TAPDENSER KYT-4000K from SEISHIN ENTERPRISE CO., LTD.

The particle size was measured by MT 3300 EX2 from MicrotrackBEL Co., Ltd.

The results obtained are summarized in Table 1.

[Solubility]
The solubility of the resulting particulate stannous oxide was evaluated by determining a dissolution time as follows:

7.5 mL of 96% methanesulfonic acid was collected and dilute to 50 mL with pure water. 5.0 g of stannous oxide was rapidly introduced into an aqueous methanesulfonic acid solution in a 50 mL beaker, and the time from introduction to dissolution was measured while stirring the solution with a stirrer at 500 rpm. The solution temperature at this time was 23° C. Based on visual observation that black muddiness became colorless and transparent, it was determined that the dissolution was completed, and the time was measured. Further, turbidity after dissolving tin oxide in methanesulfonic acid and allowing it to stand for 5 minutes was measured with a digital turbidity meter 500 G (model TB-500 G) from KYORITSU CHEMICAL-CHECK Lab., Corp. These results are summarized in Table 1. Moreover, FIG. 1 shows an appearance of the solution after dissolution in the dissolution test.

[SEM Image]

Figure 2:
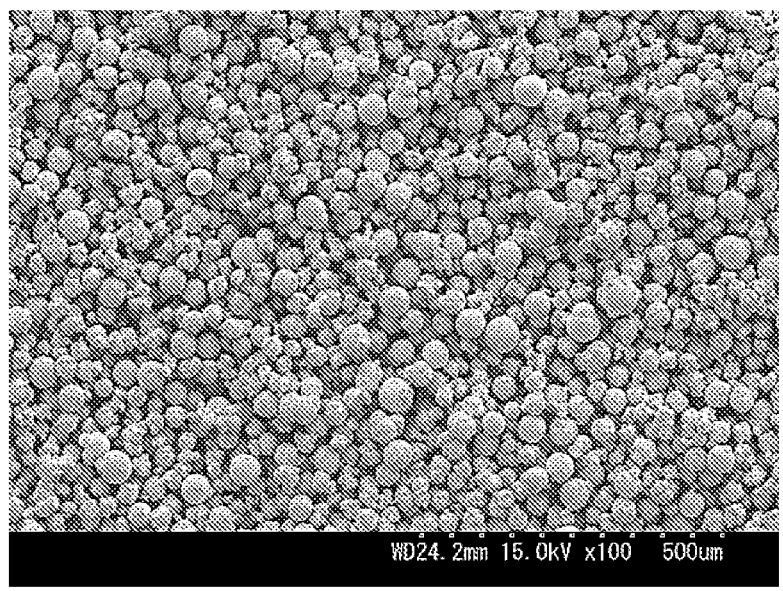
FIG. 2 shows a SEM image photograph for stannous oxide according to Example 1.

The resulting particulate stannous oxide was observed by SEM (Electron Microscope S-3000 N from Hitachi High-Technologies Corporation). A SEM image of stannous oxide is shown in FIG. 2.

Example 2

As Example 2, particulate stannous oxide was obtained in the same procedure as that of Example 1 with the exception that the conditions were changed as follows:

That is, in Example 1, the introduced amount of ammonium bicarbonate for obtaining the reaction mother solution The resulting particulate stannous oxide was evaluated in the same procedure as that of Example 1. The results are summarized in Table 1.

Comparative Example 1

Figure 3:
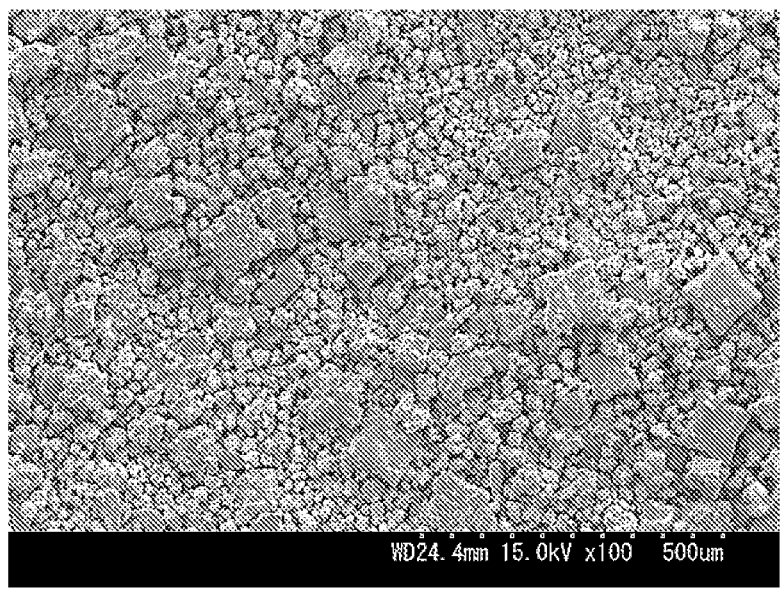
FIG. 3 shows a SEM image photograph for stannous oxide according to Comparative Example 1.

Commercially available stannous oxide (available from JX Metals Trading Co., Ltd.) was prepared and evaluated in the same procedure as that of Example 1. The results are summarized in Table 1. Further, an SEM image of the stannous oxide is shown in FIG. 3.

Comparative Example 2

Commercially available stannous oxide (available from JX Metals Trading Co., Ltd.) was prepared and evaluated in the same procedure as that of Example 1. The results are summarized in Table 1. It should be noted that the commercially available product prepared in Comparative Example 2 has a different production lot from that of the commercially available product prepared in Comparative Example 1.

TABLE 1

| Examples | Impurities | Specific Surface Area ($m^2/g$) | TAP Density ($g/cm^3$) | 50% Particle Size (μm) | Dissolution Time and Turbidity | Water Content (wt. %) |
|---|---|---|---|---|---|---|
| Example 1 | Ag, As, Bi, Ca, Cd, Co, Cr, Cu, Fe, In, K, Mg, Mn, Na, Ni, Pb, Th, Tl, U, Zn < 1 ppm P < 10 ppm Cl < 1 ppm Sb: 1.6 ppm | 0.30 | 2.63 | 37.8 | 10 seconds 20 degrees | 3 |
| Example 2 | Ag, As, Bi, Ca, Cd, Co, Cr, Cu, Fe, In, K, Mg, Mn, Na, Ni, Pb, Th, Tl, U, Zn < 1 ppm P < 10 ppm Cl < 1 ppm Sb: 1.1 ppm | 0.34 | 2.63 | 41.2 | 10 seconds 20 degrees | 2 |
| Comparative Example 1 | Co: 1.6 ppm, Cu: 2.3 ppm, Fe: 11 ppm, K < 1 ppm, Mg: 3.2 ppm, Na: 350 ppm, Pb: 37 ppm, Th < 1 ppm, U < 1 ppm, Zn < 1 ppm, Cl: 110 ppm Sb: 4 ppm | 0.75 | 2.50 | 34.2 | 30 seconds 20 degrees | 5 |
| Comparative Example 2 | Co < 1 ppm, Cu: 3.7 ppm, Fe: 22 ppm, K: 1 ppm, Mg: 8.4 ppm, Na: 370 ppm, Pb: 35 ppm, Th < 1 ppm, U < 1 ppm, Zn < 1 ppm, Cl: 86 ppm Sb: 2 ppm | 0.66 | 2.63 | 59.9 | 35 seconds 20 degrees | 5 | was increased so as to obtain 195 g/L of ammonium bicarbonate. Further, the solution was heated and maintained at 60° C. to 65° C., the solution temperature during the dropping reaction was maintained at 60° C. to 65° C. (first stage heat-maintaining temperature), and the dropping was carried out over about 3 hours. At the end of the dropping, the temperature was raised to 70 to 75° C. and further maintained for about 2 hours (second heat-maintaining temperature).

[Evaluation of Oxidation Resistance (Aluminum Laminate)]

The stannous oxide obtained in Example 1 was double-vacuum-packed in an aluminum laminate bag and stored at a temperature of 40° C. for 3 months. The solubility was then evaluated in the same procedure as above, indicating that the dissolution time and the turbidity were 8 seconds and 20 degrees, respectively. That is, it was revealed that even after storage for 3 months, substantially no decrease in the solubility was observed, and the stannous oxide had improved oxidation resistance.

[Evaluation of Oxidation Resistance (Storage in Atmosphere)]

Figure 4:
FIG. 4 is a photograph showing an appearance of a solution in a dissolution test according to Example 1 after leaving it for 24 hours in the atmosphere.
Figure 5:
FIG. 5 is a photograph showing an appearance of a solution in a dissolution test according to Comparative Example 1 after leaving it for 24 hours in the atmosphere.

The stannous oxide obtained in each of Example 1 and Comparative Example 1 was stored at room temperature in the atmosphere for 24 hours in order to compare sensitivities to the oxidation. The solubility was then evaluated in the same procedure as above. The results are summarized in Table 2 below. The upper row in Table 2 is the dissolution time (second) and the lower row is the turbidity (degree) of the solution. Appearances of the solutions in the dissolution test are shown in FIG. 4 (Example 1) and FIG. 5 (Comparative Example 1).

TABLE 2

|  | Before Storage | 24 Hours after Storage at Room Temperature |
|---|---|---|
| Example 1 | 8 seconds | 10 seconds |
|  | 20 degrees | 20 degrees |
| Comparative Example 1 | 35 seconds | 35 seconds |
|  | 20 degrees | 40 degrees |

As can be seen from the results, it was revealed that in Example, there was no change in turbidity after dissolution even after storage for 24 hours, whereas in Comparative Example, the muddiness was generated after storage for 24 hours, and that even after storage for 24 hours, the stannous oxide powder according to Example did not undergo any oxidation to the extent that it appeared in the turbidity after dissolution, whereas Comparative Example underwent the oxidation to the extent that it appeared in the turbidity after dissolution.

[Evaluation of Particle Size Distribution]

Figure 6:
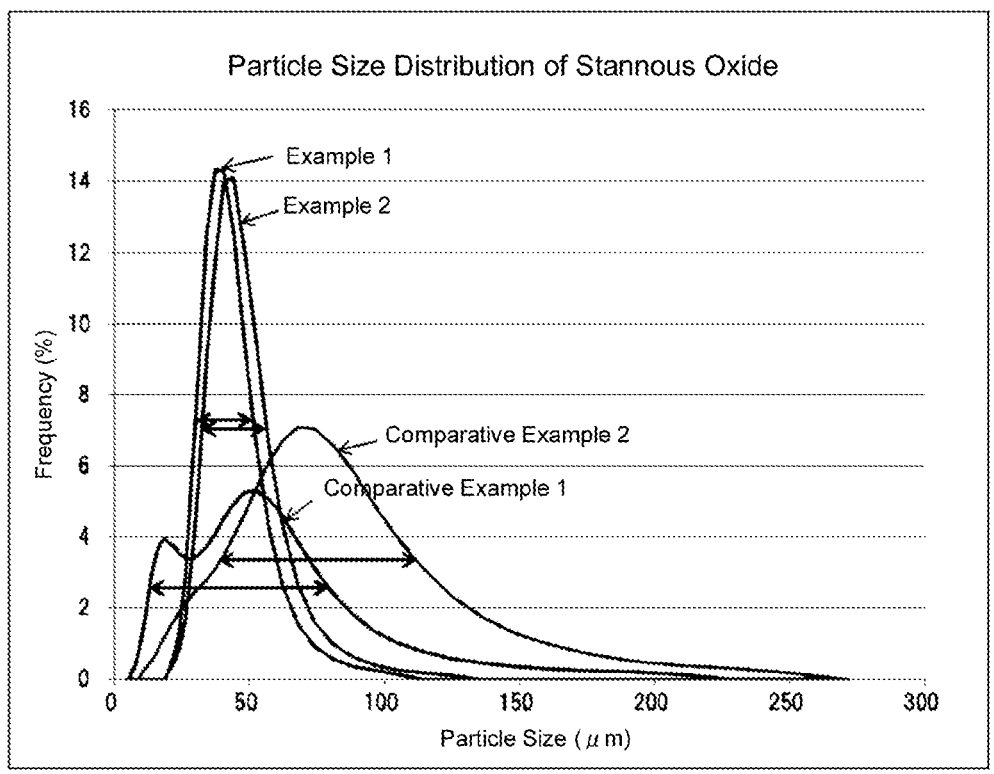
FIG. 6 is a graph showing results of measuring particle size distributions of stannous oxide powders according to Examples 1 and 2 and Comparative Examples 1 and 2.

Results of measuring the particle size distributions of the stannous oxide powders according to Examples 1 and 2 and Comparative Examples 1 and 2 are shown in FIG. 6 and Table 3. In the graph of FIG. 6, double-headed arrows in the horizontal direction represent positions corresponding to the half widths of the curves of Examples 1 and 2 and Comparative Examples 1 and 2, respectively.

TABLE 3

|  | 50% Particle Size (μm) | Half Width (μm) |
|---|---|---|
| Example 1 | 37.8 | 21.2 |
| Example 2 | 41.2 | 26.0 |
| Comparative Example 1 | 34.2 | 67.6 |
| Comparative example 2 | 59.9 | 73.8 |

It was found from the results that the half widths of Examples 1 and 2 were lower than those of Comparative Examples 1 and 2. Although the reason why the stannous oxide powders according to Examples 1 and 2 are superior in oxidation resistance is unknown, the present inventors believe that it is related to the powder having the lower D50 while at the same time having the uniform particle size.

INDUSTRIAL APPLICABILITY

According to the present invention, a stannous oxide powder having improved solubility and also improved oxidation resistance can be provided. The present invention is an industrially useful invention.

The invention claimed is:

1. A stannous oxide powder comprising stannous oxide and inevitable impurities, the stannous oxide powder having:
a stannous oxide content of 99.99% by mass or more in dry mass;
a specific surface area of less than 0.5 m²/g;
a D50 particle size of from 20 to 60 μm; and
a half width of a particle size distribution of from 5 to 30 μm.

2. The stannous oxide powder according to claim 1, wherein a water content in stannous oxide is from 1 to 5 wt %.

3. The stannous oxide powder according to claim 1, wherein the stannous oxide powder has a chlorine content of 1 ppm or less and a sulfur content of 10 ppm or less.

4. The stannous oxide powder according to claim 1, wherein the stannous oxide powder has a sodium content of 5 ppm or less and a potassium content of 5 ppm or less.

5. The stannous oxide powder according to claim 1, wherein the stannous oxide powder has an antimony content of 5 ppm or less.

6. The stannous oxide powder according to claim 1, wherein the stannous oxide powder has a TAP density of from 1.0 to 4.0 g/cm³.

7. The stannous oxide power according to claim 1, wherein when 100 g/L of stannous oxide powder is added to a solution having a methanesulfonic acid concentration of 100 g/L, the stannous oxide is dissolved in the solution for a time less than or equal to 30 seconds and has a turbidity after dissolution of 20 degrees.

* * * * *